(12) United States Patent
Lin

(10) Patent No.: US 7,327,120 B2
(45) Date of Patent: Feb. 5, 2008

(54) CHARGER ASSEMBLY FOR A POWER CELL FOR AN ELECTRICAL TOOL

(75) Inventor: Chun-Hsiao Lin, Taichung (TW)

(73) Assignee: Techway Industrial Co., Ltd., Taichung (TW)

( * ) Notice: Subject to any disclaimer, the term of this patent is extended or adjusted under 35 U.S.C. 154(b) by 462 days.

(21) Appl. No.: 11/024,507

(22) Filed: Dec. 29, 2004

(65) Prior Publication Data

US 2006/0139001 A1 Jun. 29, 2006

(51) Int. Cl.
*H01M 10/46* (2006.01)
(52) U.S. Cl. .................................... 320/115
(58) Field of Classification Search ............. 320/107, 320/110, 112, 113, 114, 115; 429/96, 99, 429/100; D13/103, 107
See application file for complete search history.

(56) References Cited

U.S. PATENT DOCUMENTS 5,592,064 A * 1/1997 Morita ........................ 320/110
6,018,227 A * 1/2000 Kumar et al. ............... 320/106
6,057,608 A * 5/2000 Bailey et al. ................. 307/43

* cited by examiner

*Primary Examiner*—Edward H Tso
(74) *Attorney, Agent, or Firm*—Alan Kamrath; Kamrath & Associates PA

(57) ABSTRACT

A power cell and charger assembly for an electrical tool has a power cell with two locking devices and a charger base with a sliding cover. The power cell and the charger base slidably engage each other. By setting the locking devices composed of push buttons and biasing members, the power cell and the charger base can be firmly engaged and conveniently detached. Additionally, the sliding cover protects the electrodes from corroding or becoming dusty when power cell is not attached to the charger base. Therefore, the power cell is conveniently attached to or disengaged from the charger base, and the power cell and charger assembly has long life span when the electrodes are kept clean by the sliding cover.

7 Claims, 8 Drawing Sheets

CHARGER ASSEMBLY FOR A POWER CELL FOR AN ELECTRICAL TOOL

BACKGROUND OF THE INVENTION

1. Field of the Invention

The invention relates to a charger assembly for a power cell for an electrical tool, and more particularly to a charger assembly for a power cell that can be detached conveniently and is dustproof.

2. Description of Related Art

With reference to FIG. 8, a conventional charger assembly for a power cell of an electrical tool mainly comprises a power cell (50) and a charger base (60).

The power cell (50) is substantially a parallelepiped and has a bottom (not numbered), a contact face and a recessed track (54). The recessed track (54) is defined in the contact face (52) and has two sidewalls, two grooves (542), a contact surface (not numbered) and multiple electrodes (544). The grooves (542) are defined respectively in the two sidewalls, and the contact surface is defined between the sidewalls. The electrodes (544) protrude from the contact surface of the recessed track (54).

The charger base (60) is substantially a parallelepiped and has a top (not numbered), a contact face (62) and a charging rail (64). The contact face (62) is formed on the top of the charger base (60). The charging rail (64) is formed on and extends up from the contact face (62), corresponds to the recessed track (54) of the power cell (50) and has a top, two sides, two flanges (642) and multiple electrodes (644). The flanges (642) extend respectively from the two sides at the top and correspond to the grooves (542) in the recessed track (54) of the power cell (50). The electrodes (644) protrude from the top of the charging rail (64) and align with the electrodes (544) in the recessed track (54) of the power cell (50) when the recessed track (54) is fully seated on the charging rail (64).

However, the conventional charger assembly for a power cell has some drawbacks caused from its structure. For example, the electrodes directly abutting each other gradually wear down or deform and do not make firm electrical contact with each other so the power cell (50) occasionally disconnects from the charger base (60) when the power cell (50) is charging. Moreover, the electrodes (644) on the charger base (60) are exposed to the environment, which causes two problems. First, users may be shocked when they inadvertently touch the exposed electrodes on the charger base (60). Second, contacts on the charger base (60) easily corrode or become dusty after a period of time without any cover, which may cause the charger base (60) to malfunction.

The present invention has arisen to provide a charger assembly for a power cell for an electrical tool to eliminate or obviate the drawbacks of the conventional charger assembly for a power cell.

SUMMARY OF THE INVENTION

The main objective of the present invention is to provide a power cell and charger assembly that can be engaged firmly to ensure electrical continuity and protect electrodes from corroding and becoming dusty.

To achieve the foregoing main objective, the charger assembly for a power cell in accordance with the present invention comprises a power cell with two locking devices and a charger base with a sliding cover.

The power cell has two sides, a bottom contact face, two flanges, two through holes, a contact surface, multiple electrodes and two locking devices. The flanges are formed on the bottom contact face respectively near the two sides. The through holes are defined in the bottom contact face respectively outside the two flanges. The contact surface is formed between the two flanges. The electrodes are mounted on the bottom contact face. The two locking devices are attached respectively to the two sides.

The charger base has a top contact face, two tracks, an electrode base, a positive stop and a sliding cover. The top contact face has a mounting hole. The tracks are formed on the top contact face respectively outside the mounting hole to engage the two flanges on the power cell and respectively have a lip and a locking cutout. The two locking cutouts are defined respectively in the two tracks to engage the locking devices. The electrode base is mounted in the mounting hole and has multiple electrodes to make electrical contact with the electrodes on the power cell. The positive stop is mounted through the mounting hole to properly position the power cell on the charger base. The sliding cover is mounted movably on the two tracks over the electrodes.

By setting the locking devices, the power cell is firmly attached to and conveniently detached from the charger base. Additionally, the sliding cover protects the electrodes from rusting or becoming dusty when the charger base is not in use.

Further benefits and advantages of the present invention will become apparent after a careful reading of the detailed description in accordance with the drawings.

DETAILED DESCRIPTION OF THE PREFERRED EMBODIMENT

A charger assembly for a power cell for an electrical tool in accordance with the present invention comprises a power cell and a charger base. The power cell has two locking devices, and the charger base has a sliding cover selectively covering multiple electrodes. The locking devices allow the power cell to be firmly attached to and conveniently detached from the charger base. Additionally, the sliding cover protects the electrodes from rusting or becoming dusty when the power cell is not mounted on the charger base.

Figure 1:
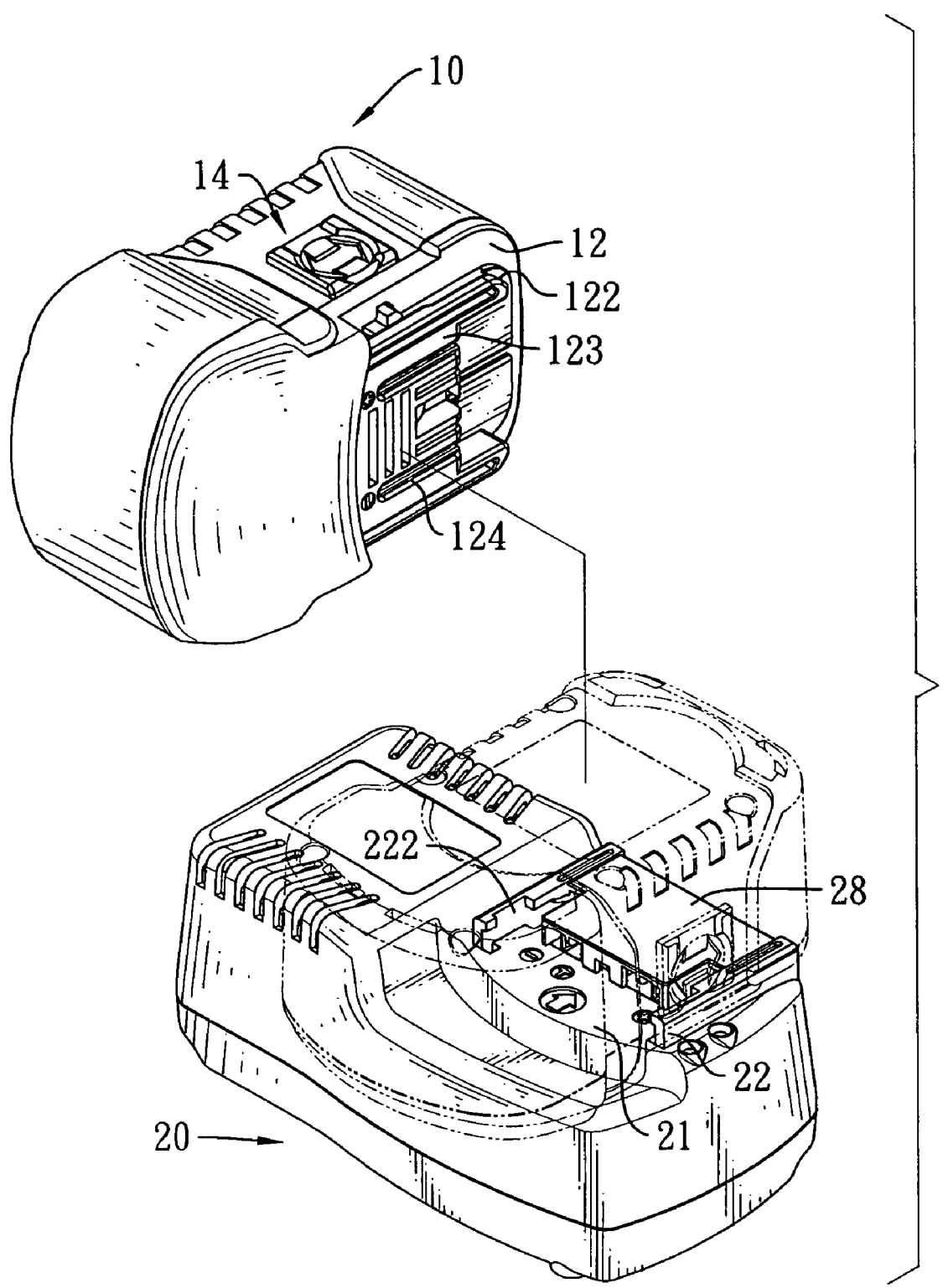
FIG. 1 is an exploded perspective view of a charger assembly for a power cell in accordance with the present invention, wherein the phantom lines depict the power cell mounted on the charger base.
Figure 2:
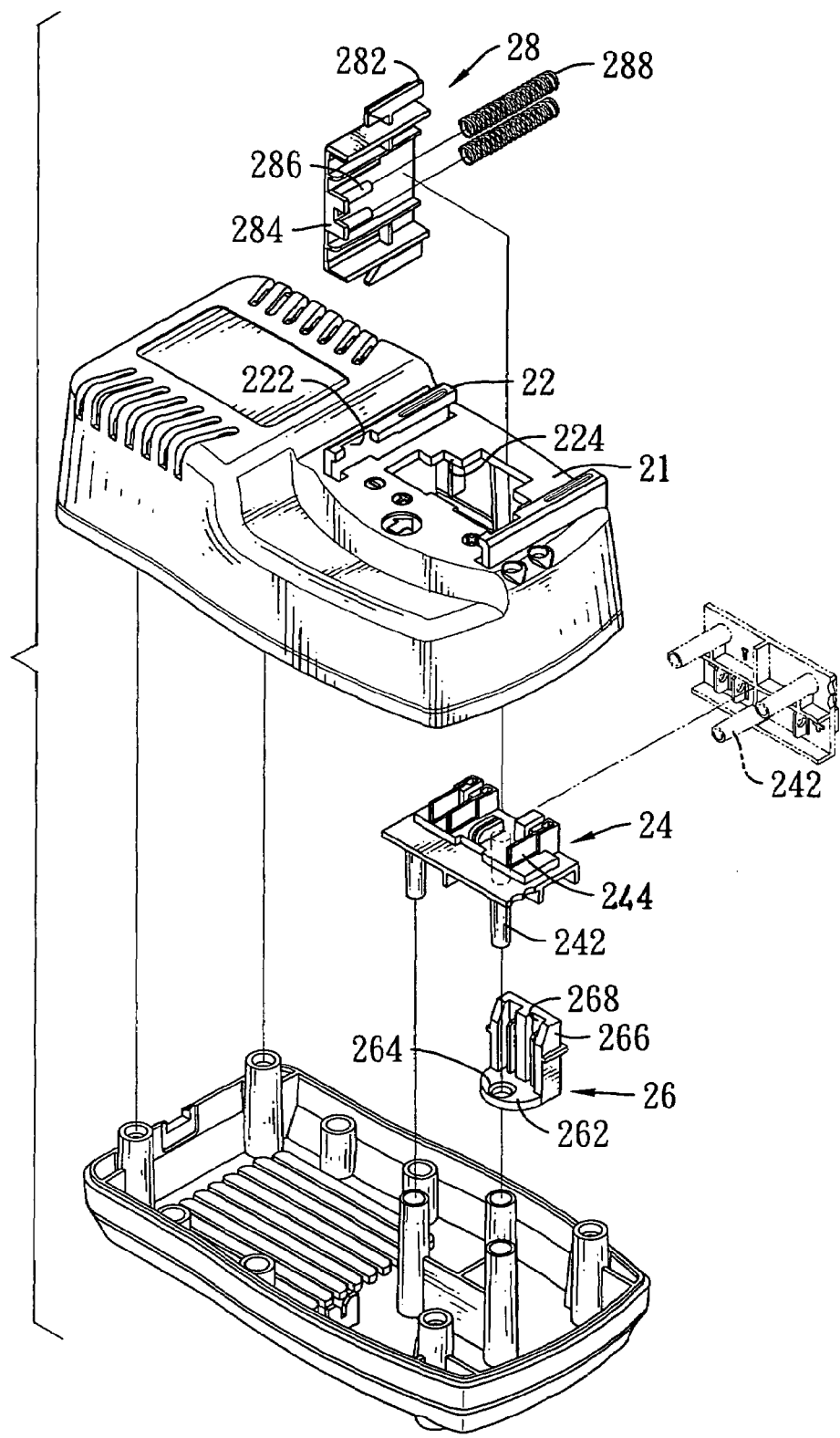
FIG. 2 is an exploded perspective view of the charger base in FIG. 1.
Figure 3:
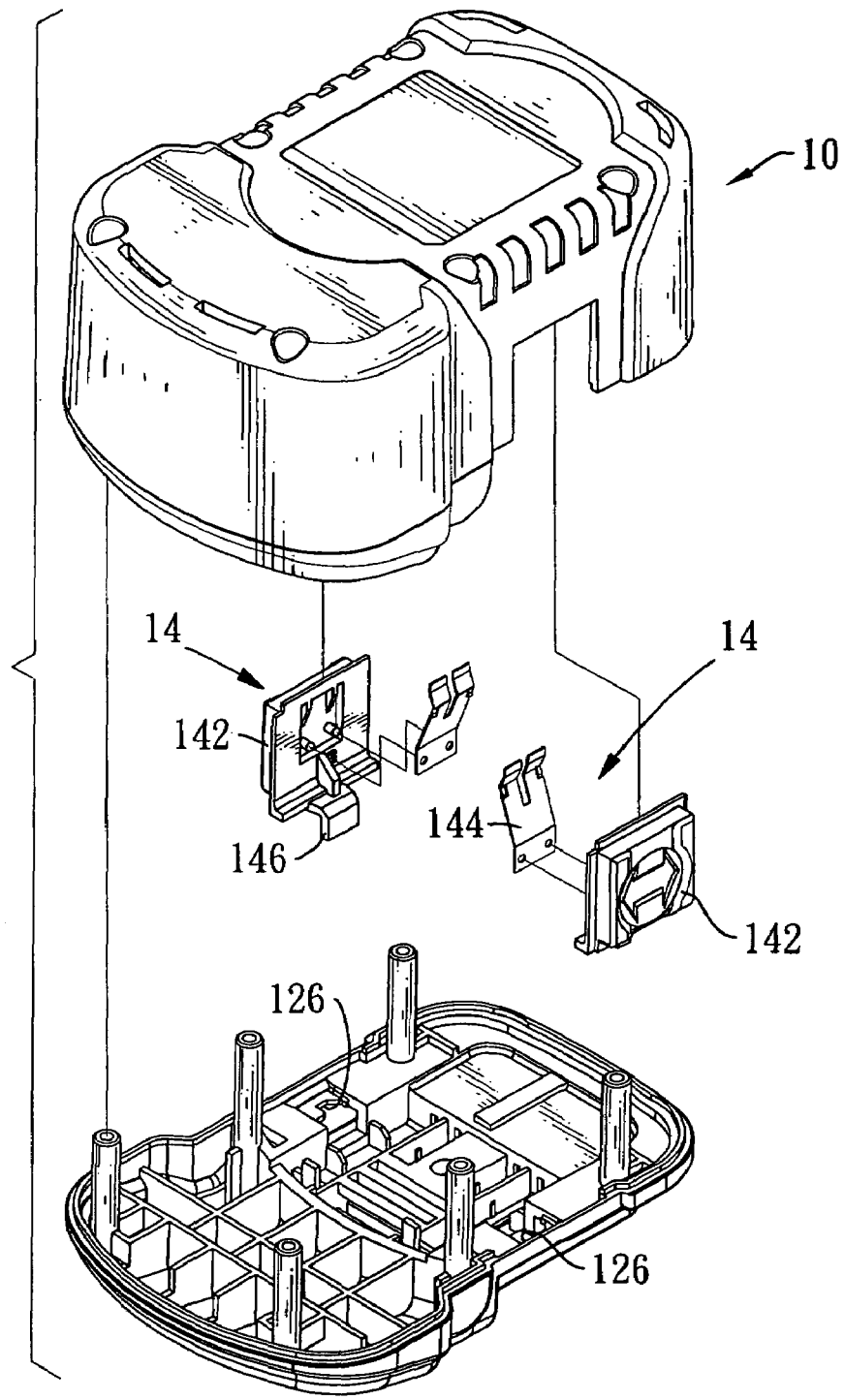
FIG. 3 is an exploded perspective view of the power cell in FIG. 1.

With reference to FIGS. 1 to 3, a preferred embodiment of the charger assembly for a power cell in accordance with the present invention comprises a power cell (10) and a charger base (20).

The power cell (10) has a box-like casing, two flanges (122), two through holes (126), a contact surface (123), multiple elongated electrodes (124) and two locking devices (14). The casing has a bottom contact face (12) and two sides. Each side has a mounting hole and an inside surface. The two flanges (122) are formed in parallel on the bottom contact face (12) respectively near the two sides. The two through holes (126) are defined in the bottom contact face (12) respectively near and outside the two flanges (122). The contact surface (123) formed between the two flanges (122) has multiple slits that are defined longitudinally in the contact surface (123). The multiple elongated electrodes (124) are mounted respectively in the slits.

The two locking devices (14) are mounted respectively in the mounting holes in the two sides of the power cell (10). Each locking device (14) has a push button (142) and a biasing member (144). Each push button (142) is mounted in one corresponding mounting hole in the side of the power cell (10) and has a tongue (146) extending outward. The tongues (146) protrude respectively from the through holes (126) in the power cell (10). Each biasing member (144) has two ends attached respectively to the push button (142) and the inside surface of the side of the power cell (10) to hold the push button (142) in the mounting hole.

The charger base (20) is a box-like casing and has a top contact face (21), two tracks (22), an electrode base (24), a positive stop (26) and a sliding cover (28).

The top contact face (21) has a mounting hole (224).

The tracks (22) are formed on the top contact face (21) respectively outside the mounting hole to engage the two flanges (122) on the power cell (10). Each track (22) has a lip and a locking cutout (222). The locking cutouts (222) are defined respectively in the lips to engage the tongues (146) on the locking devices (14).

The electrode base (24) is mounted firmly inside the charger base (20), protrudes from the mounting hole (224), has a top face and multiple elongated electrodes (244), and a bottom face and a cost (242). The multiple elongated electrodes (244) are attached to the top face of the electrode base (24) to make contact respectively with the multiple elongated electrodes (124) on the power cell (10). The post (242) is formed on the bottom face.

The positive stop (26) is mounted firmly inside the charger base (20), may be attached to the electrode base (24) and protrudes from the mounting hole (224). The positive stop (26) has a base (262), an aperture (264), a vertical stop (266) and two recesses (268). The base (262) is mounted inside the charger base (20) and may be attached to the electrode base (24). The vertical stop (266) is integrally formed with and extends perpendicular from the base (262) and protrudes through the mounting hole (224). The aperture (264) receives the post (242).

The sliding cover (28) is U-shaped, is mounted slidably on the charger base (20) and has two sides, a front end, an open rear end, two wings (282), two spring posts (286) and two springs (288). The front end has two tabs (284) and gaps defined between the tabs (284) and the gaps to allow the elongated electrodes (244) on the electrode base (24) to pass through the front end. The open rear end of the sliding cover (28) faces the positive stop (26). The two wings (282) extend respectively from the two sides and are mounted slidably inside the tracks (22). The two spring posts (286) extend inward respectively from the two tabs (284), and the two springs (288) are mounted respectively around the two spring posts (286) and press against the positive stop (26). The vertical stop (266) defines two recesses (268) which respectively accommodate the two springs (288). Preferably, the sliding cover (28) further has multiple recesses to respectively accommodate the multiple elongated electrodes (244) on the electrode base (24).

Figure 4:
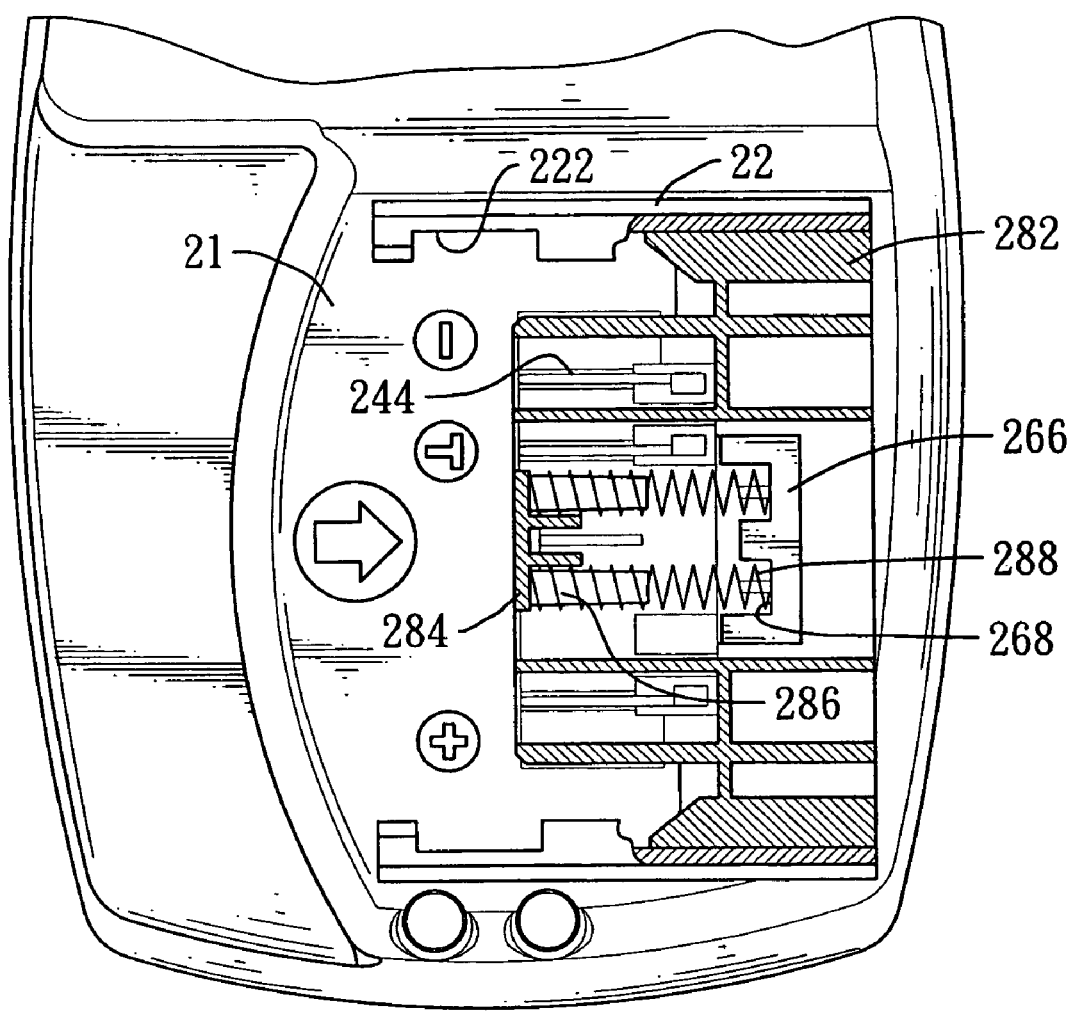
FIG. 4 is an operational top view in partial section of the charger base in FIG. 1 with the sliding cover closed.
Figure 5:
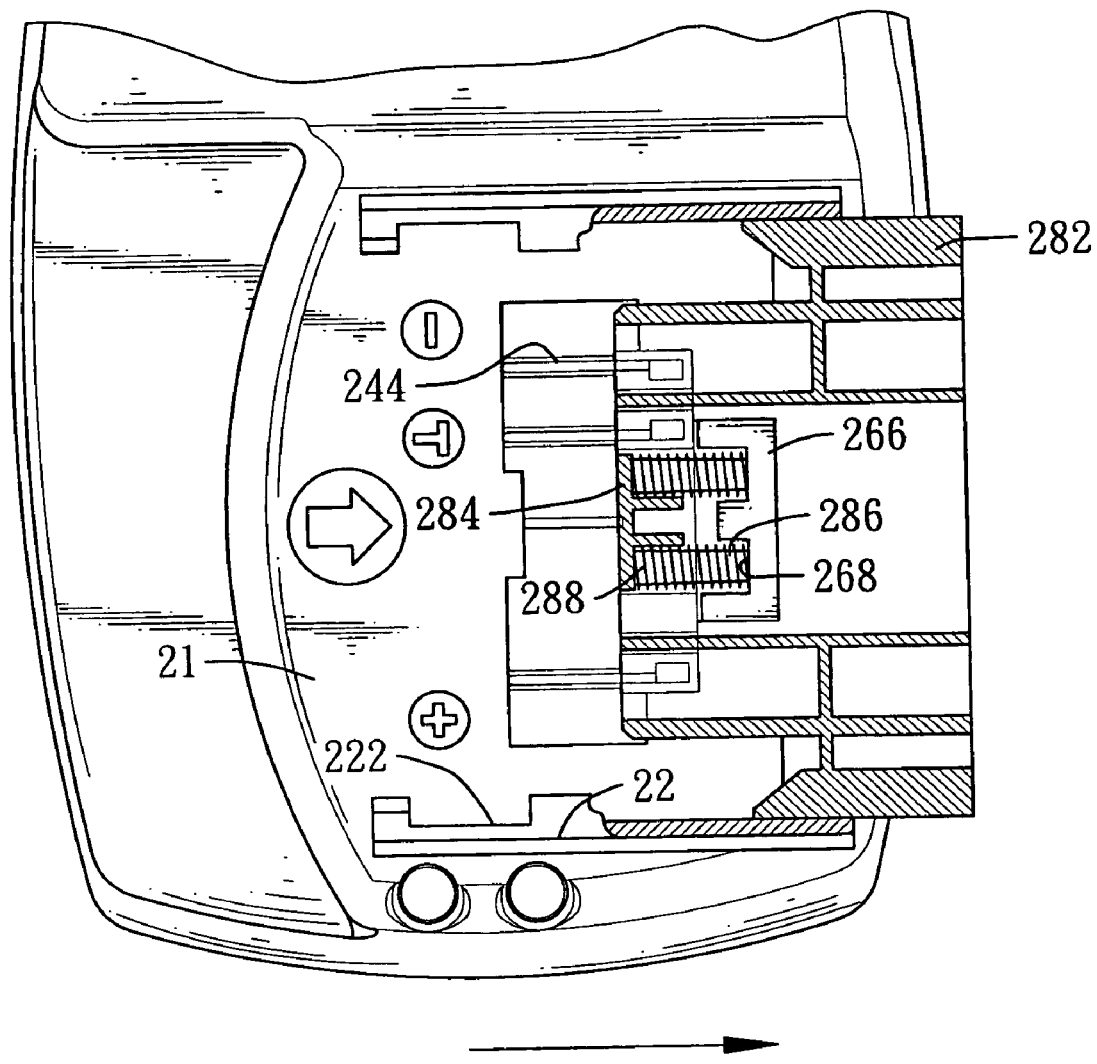
FIG. 5 is an operational top view in partial section of the charger base in FIG. 4 with the sliding cover pushed aside.

With reference to FIGS. 1, 4 and 5, the power cell (10) is attached to the charger base (20) by sliding the two flanges (122) respectively onto inner sides of the two tracks (22). Simultaneously, the contact surface (123) moves the sliding cover (28) to expose the elongated electrodes (244) and allow the elongated electrodes (244) to make contact with the elongated electrodes (124) on the power cell (10). After the power cell (10) is recharged, the power cell (10) is slidably removed from the charger base (20). The sliding cover (28) is pressed back by the springs (288) and covers the elongated electrodes (244). Therefore, the sliding cover (28) protects the elongated electrodes (244) whenever the power cell (10) is not mounted on the charger base (20).

Figure 6:
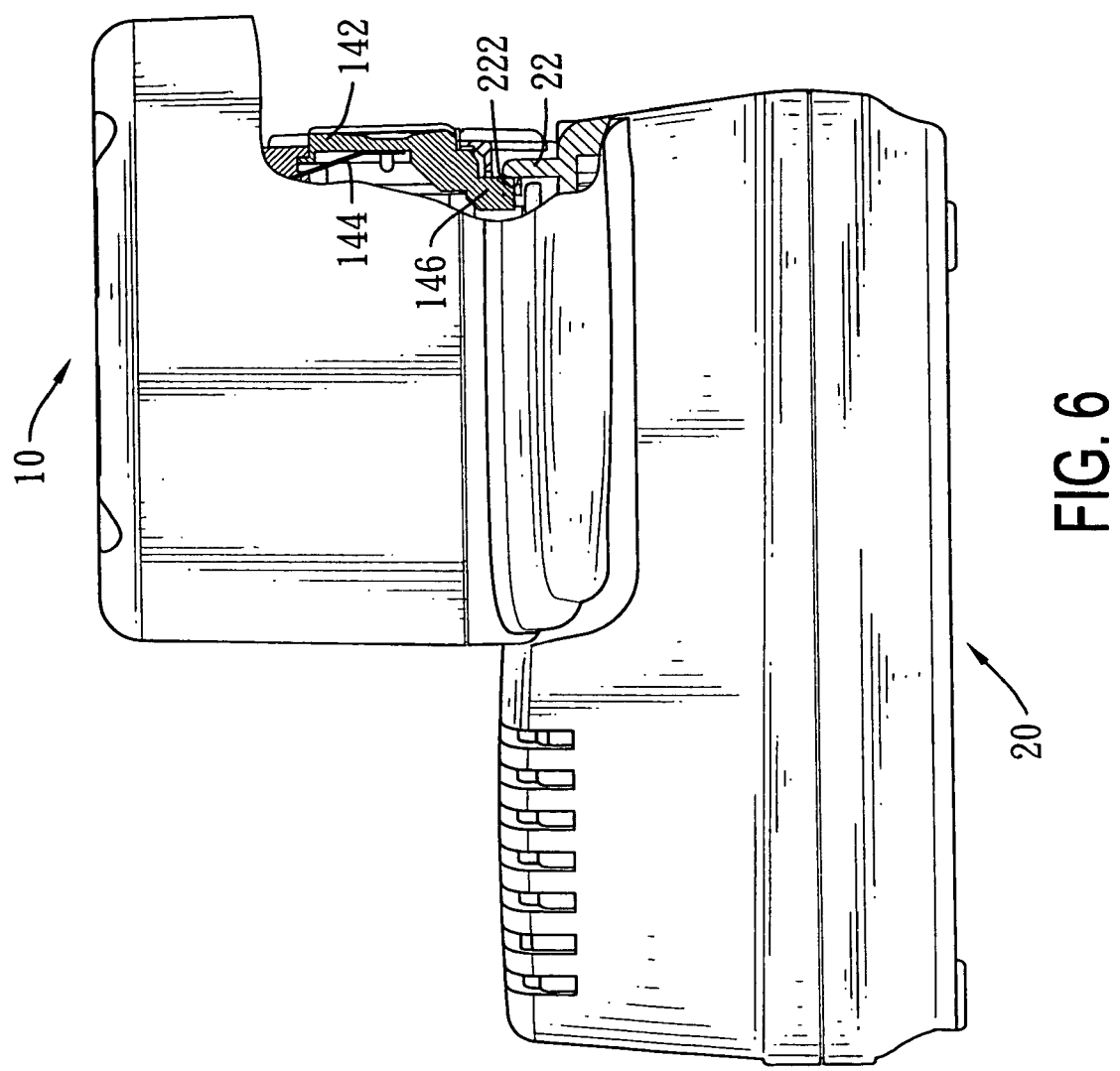
FIG. 6 is an operational side view in partial section of the charger assembly for a power cell in FIG. 5 with a locking device in the power cell engaging the charger base.
Figure 7:
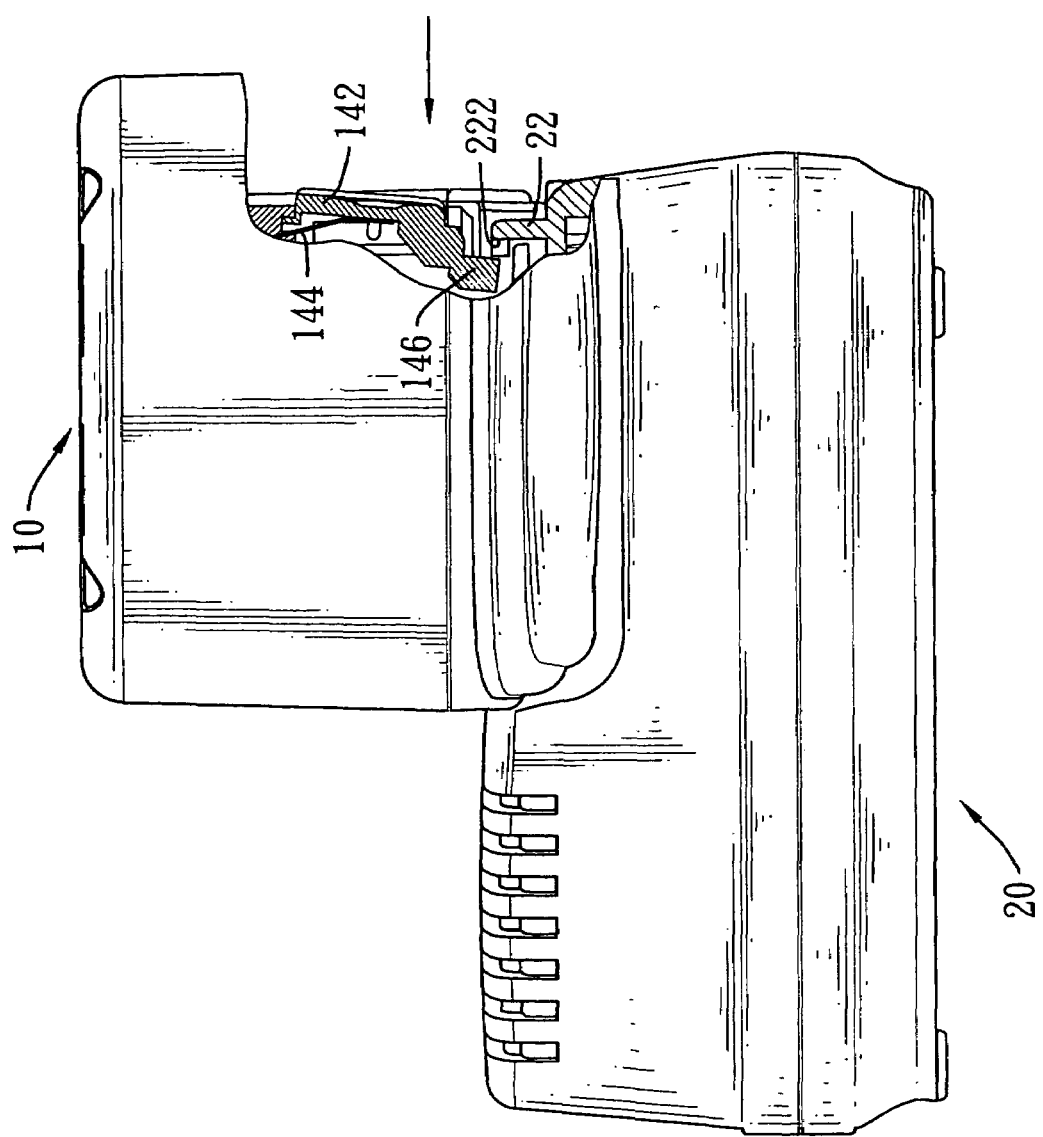
FIG. 7 is an operational side view in partial section of the charger assembly for a power cell in FIG. 6 with the power cell disengaged from the charger base.
Figure 8:
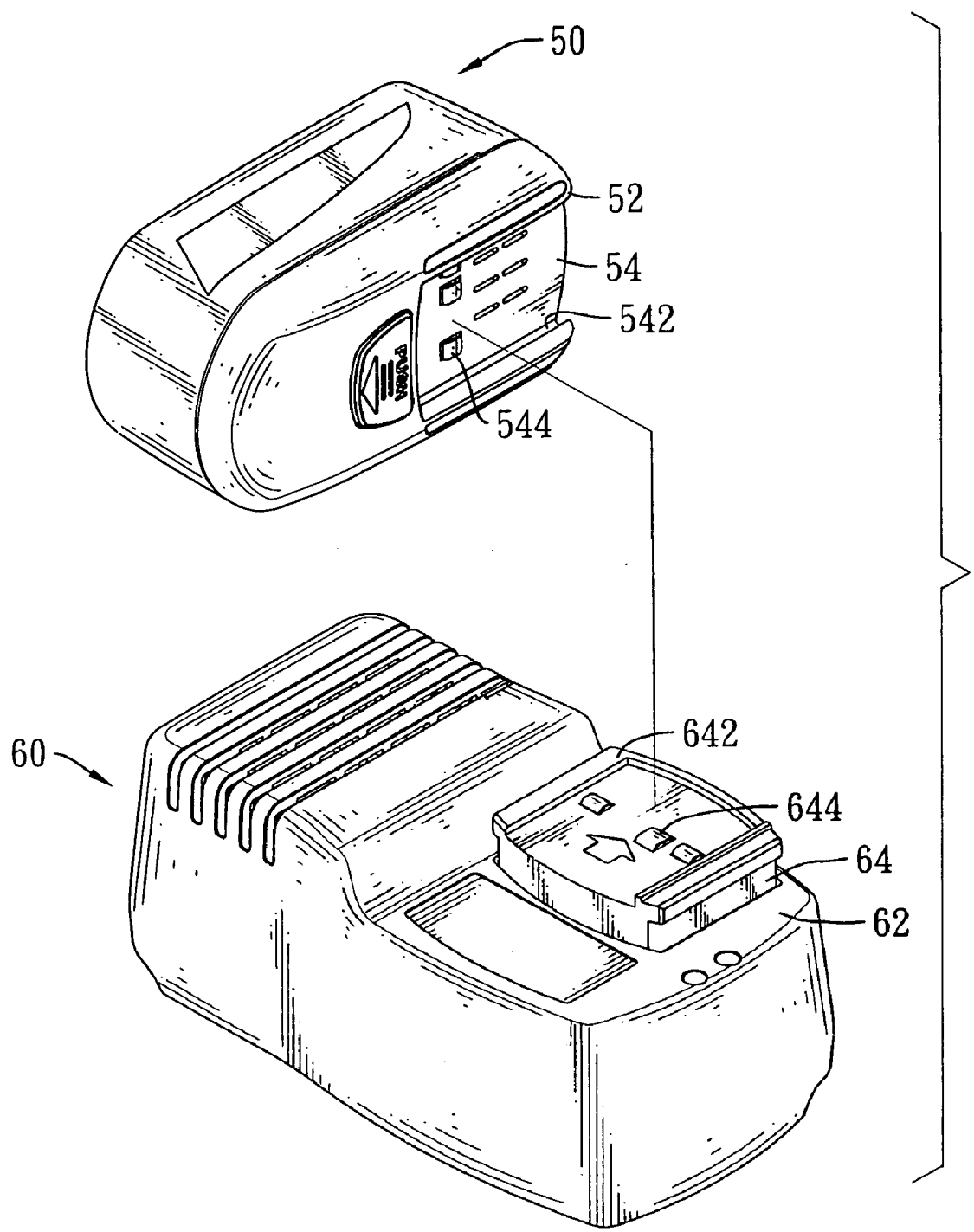
FIG. 8 is a perspective view of a conventional charger assembly for a power cell in accordance with the prior art.

With reference to FIGS. 6 and 7, the power cell (10) is attached to or detached from the charger base (20) by the locking devices (14). The tongues (146) on the locking devices (14) engage the locking cutouts (222) on the tracks (22) to attach the power cell (10) to the charger base (20). The power cell (10) is detached from the charger base (20) by pressing the push buttons (142) to disengage the tongues (146) from the locking cutouts (222). Thereby, the power cell (10) is free to slide out of the tracks (22).

The charger assembly for a power cell as described has the following advantages.

1. The locking devices (14) keep the power cell (10) steadily mounted on the charger base (20). Therefore, the electrical connection between the power cell (10) and the charger base (20) is secure and inadvertent or accidental disconnects are unlikely.

2. The elongated electrodes connect better than conventional stubbed electrodes because the elongated electrodes do not abrade each other and are not deformed. The charger assembly for a power cell of the present invention has a longer life span.

3. The sliding cover (28) protects the elongated electrodes (244) on the charger base (20) so the elongated electrodes do not corrode or become dirty. Therefore, the electrical connection of the charger base (20) is not jeopardized by contaminants.

4. Moreover, the sliding cover (28) is mounted captively on the charger base (20) so the sliding cover (28) cannot be lost. In addition, the sliding cover (28) keeps users from inadvertently touching the electrodes and being shocked.

Although the invention has been explained in relation to its preferred embodiment, many other possible modifications and variations can be made without departing from the spirit and scope of the invention as hereinafter claimed.

What is claimed is:

1. A charger assembly for a power cell for an electrical tool, the charger assembly for a power cell comprising:
   a power cell having
      two sides, each side having a mounting hole and an inside surface;
      a bottom contact face;
      two flanges formed in parallel on the bottom contact face respectively near the two sides;
      two through holes defined in the bottom contact face respectively near and outside the two flanges;

a contact surface formed between the two flanges and having multiple slits defined longitudinally in the contact surface;

multiple elongated electrodes mounted respectively in the slits in the contact surface; and two locking devices mounted respectively in the mounting holes in the two sides of the power cell; and a charger base having a top contact face having a mounting hole;

two tracks formed on the contact top face to engage the two flanges on the power cell, each track having an lip and a locking cutout defined in the lip;

an electrode base mounted firmly inside the charger base, protruding from the mounting hole in the charger base and having a top face; and multiple elongated electrodes attached to the top face of the electrode base;

a positive stop mounted firmly inside the charger base and protruding from the mounting hole in the charger base; and a sliding cover mounted slidably on the two tracks over the elongated electrodes on the charger base and having multiple springs mounted between the sliding cover and the positive stop.

2. The charger assembly for a power cell as claimed in claim 1, wherein the positive stop is attached to the electrode base and has a base mounted inside the charger base and attached to the electrode base; and a vertical stop integrally formed with and extending perpendicular from the base and protruding through the mounting hole in the top contact face.

3. The charger assembly for a power cell as claimed in claim 1, wherein the sliding cover is U-shaped and has two sides;

a front end having two tabs; and gaps defined between the tabs and the two sides to allow the elongated electrodes on the electrode base to pass through the front end;

an open rear end facing the positive stop;

two wings extending respectively from the two sides of the sliding cover and mounted slidably inside the tracks; and two spring posts extending inward respectively from the two tabs, wherein two springs are mounted respectively around the two spring posts.

4. The charger assembly for a power cell as claimed in claim 2, wherein the sliding cover is U-shaped and has two sides;

a front end having two tabs; and gaps defined between the tabs and the two sides to allow the elongated electrodes on the electrode base to pass through the front end;

an open rear end facing the positive stop;

two wings extending respectively from the two sides of the sliding cover and mounted slidably inside the tracks; and two spring posts extending inward respectively from the two tabs, wherein two springs are mounted respectively around the two spring posts.

5. The charger assembly for a power cell as claimed in claim 1, wherein each locking device comprises:

a push button mounted in a corresponding one of the mounting holes in the side of the power cell and having a tongue extending outward and protruding through the corresponding through hole in the bottom contact face of the power cell to engage the locking cutout in a corresponding track; and a biasing member having two ends attached respectively to the push button and the inside surface of the side of the power cell.

6. The charger assembly for a power cell as claimed in claim 2, wherein each locking device comprises:

a push button mounted in a corresponding one of the mounting holes in the side of the power cell and having a tongue extending outward and protruding through the through hole in the bottom contact face of the power cell to engage the locking cutout in a corresponding track; and a biasing member having two ends attached respectively to the push button and the inside surface of the side of the power cell.

7. The charger assembly for a power cell as claimed in claim 4, wherein each locking device comprises:

a push button mounted in a corresponding one of the mounting holes in the side of the power cell and having a tongue extending outward and protruding through the through hole in the bottom contact face of the power cell to engage the locking cutout in a corresponding track; and a biasing member having two ends attached respectively to the push button and the inside surface of the side of the power cell.

* * * * *